Figure 1:
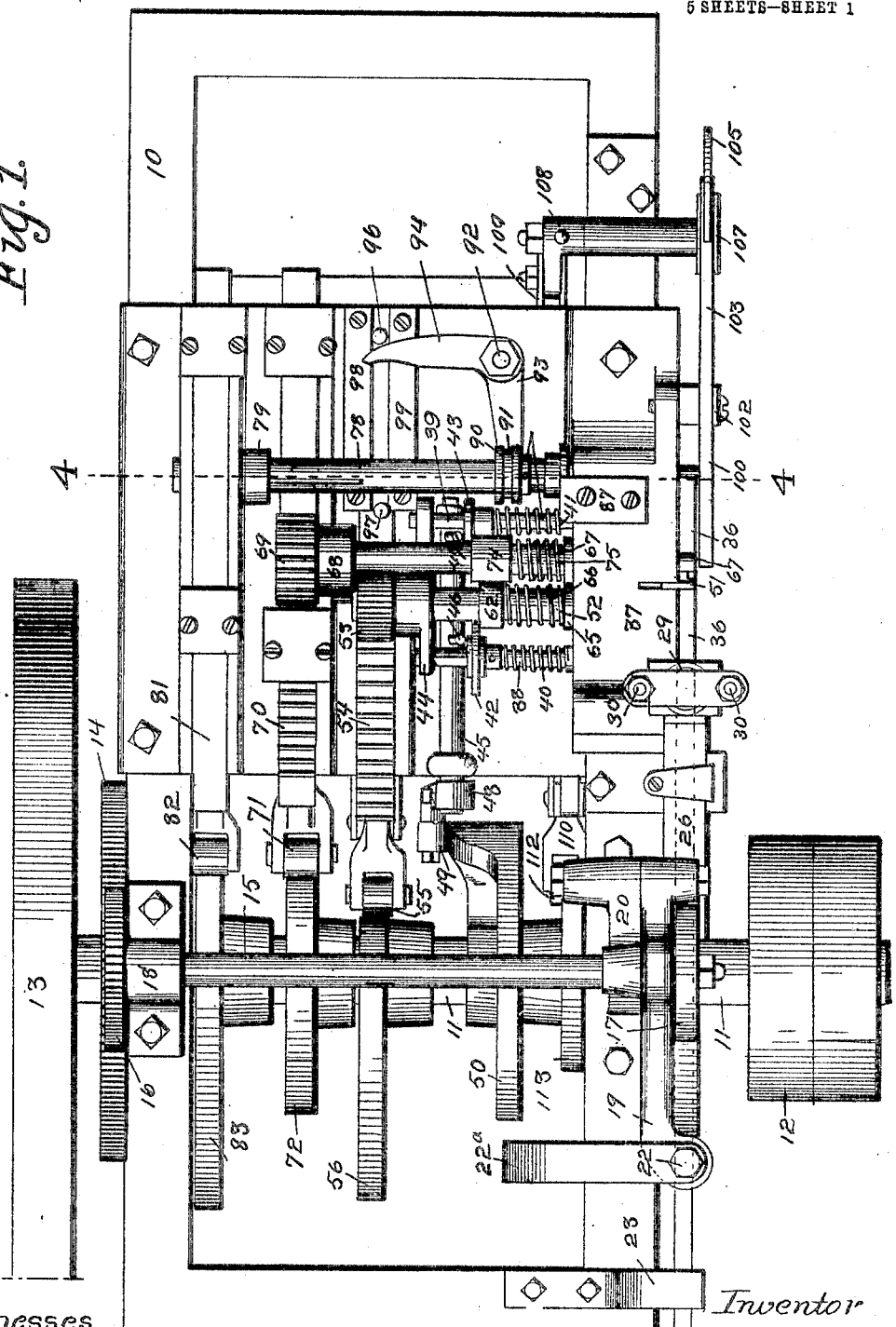

No. 797,741. PATENTED AUG. 22, 1905.
J. H. McBRIDE.
MACHINE FOR MAKING CLOTHES PINS.
APPLICATION FILED OCT. 17, 1904.

5 SHEETS—SHEET 1.

Witnesses
A. G. Hague
S. F. Christy.

Inventor
J. H. McBride
By Irving & Lane Attys

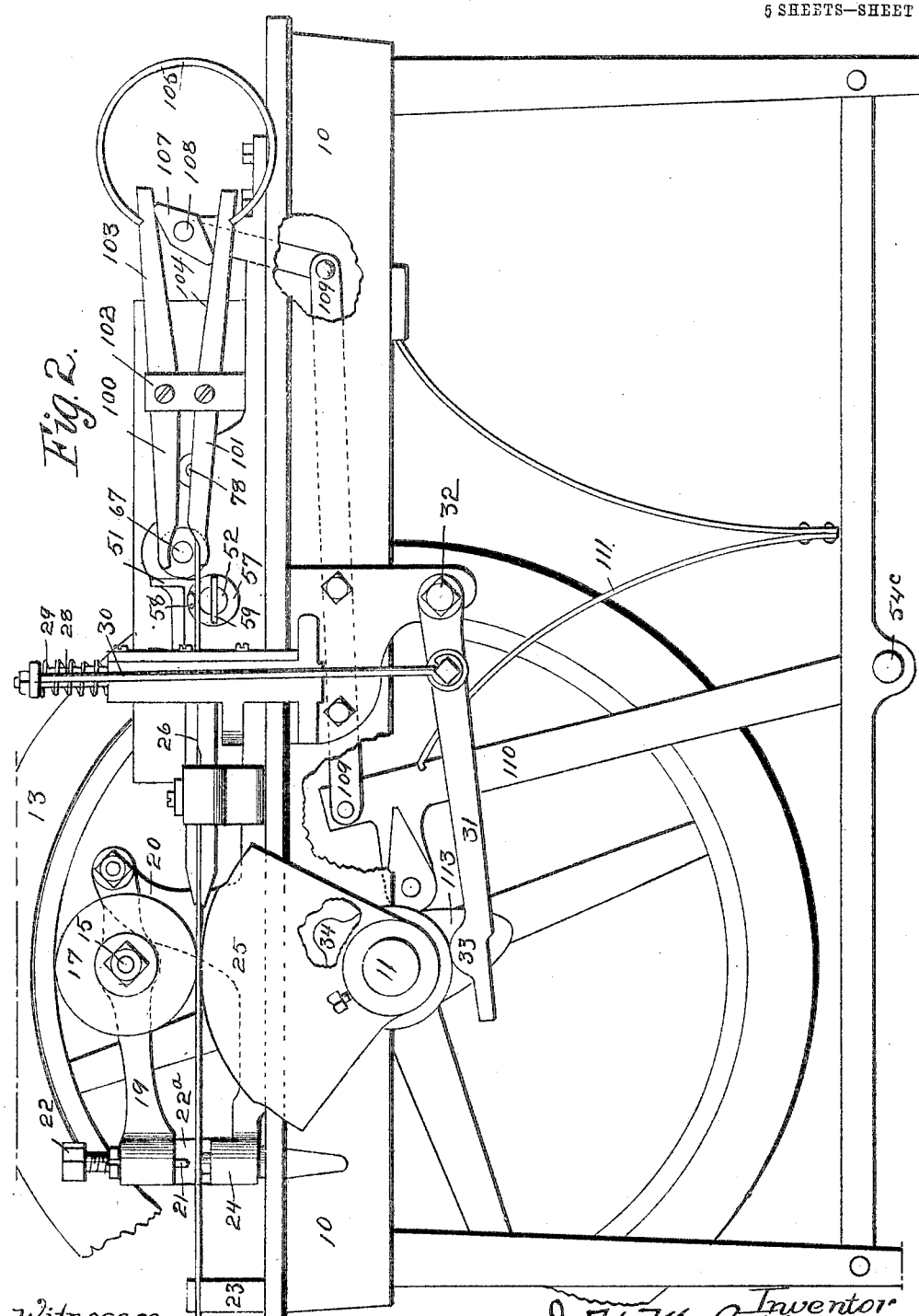

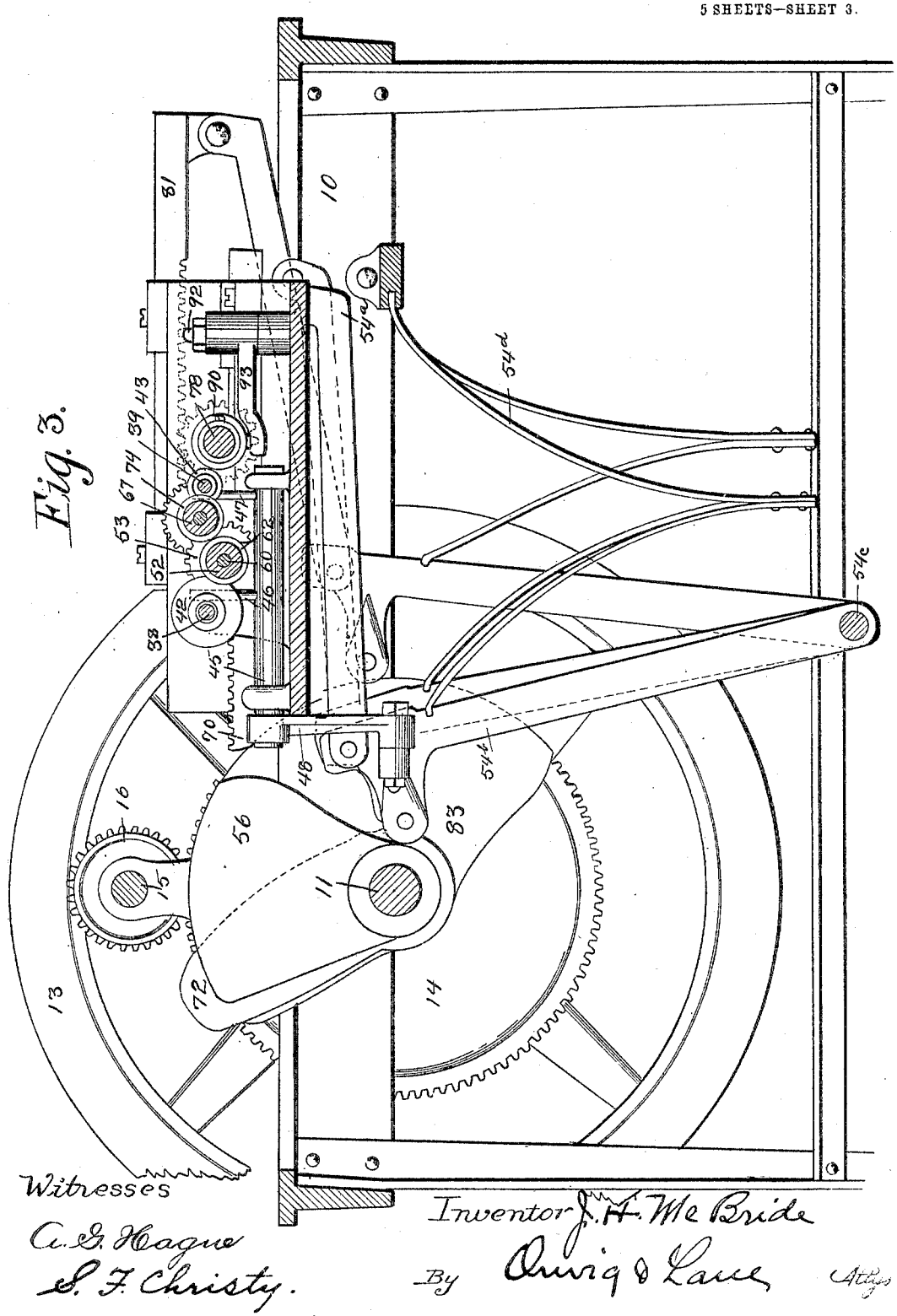

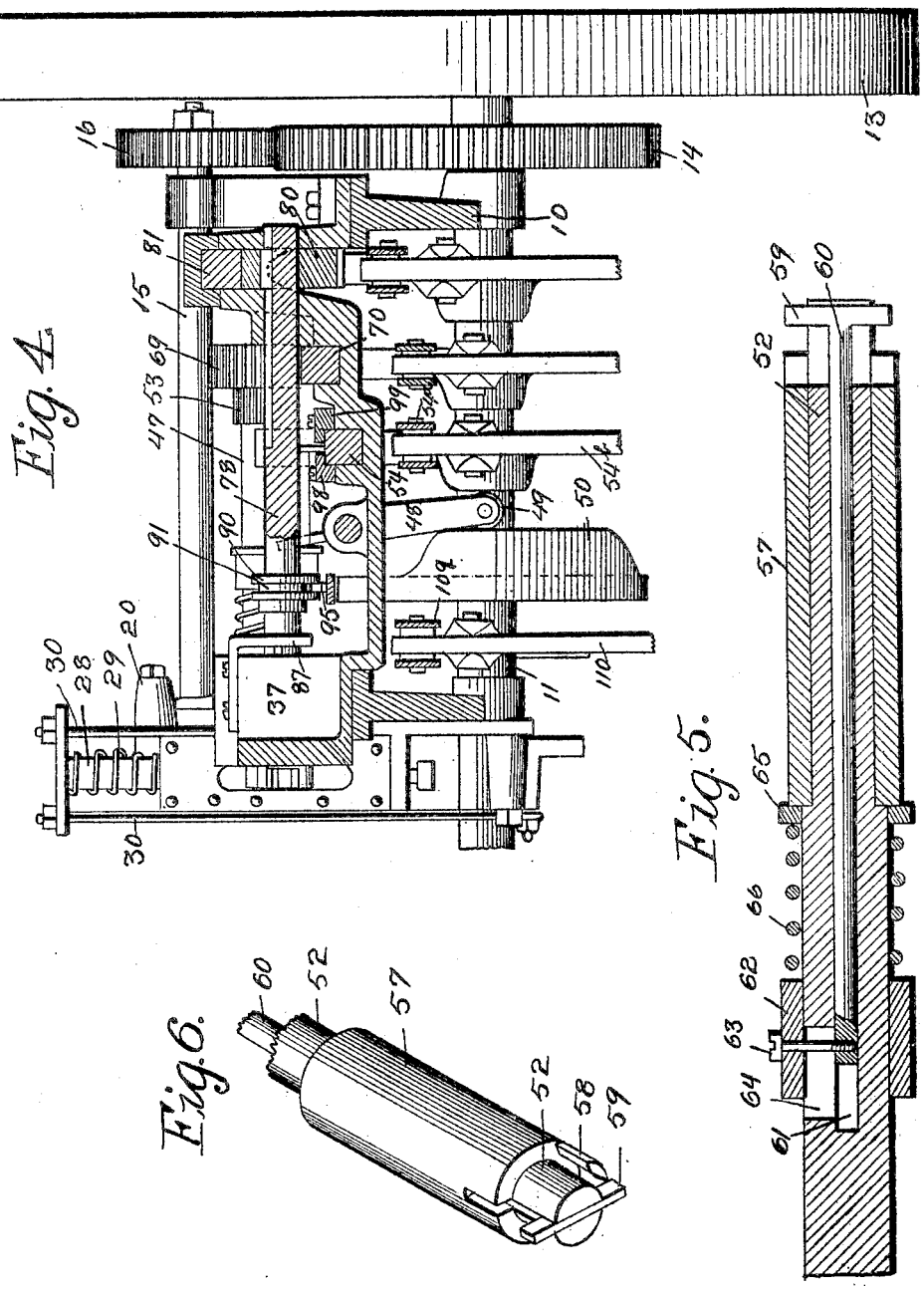

No. 797,741. PATENTED AUG. 22, 1905.
J. H. McBRIDE.
MACHINE FOR MAKING CLOTHES PINS.
APPLICATION FILED OCT. 17, 1904.
5 SHEETS—SHEET 5.
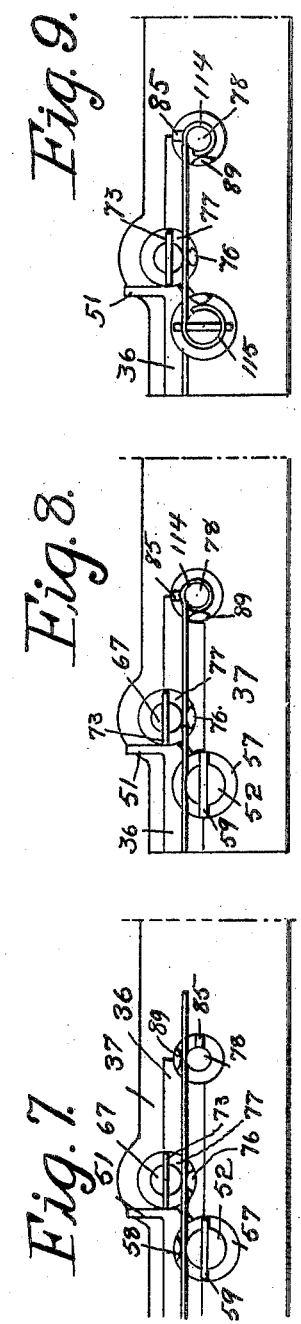
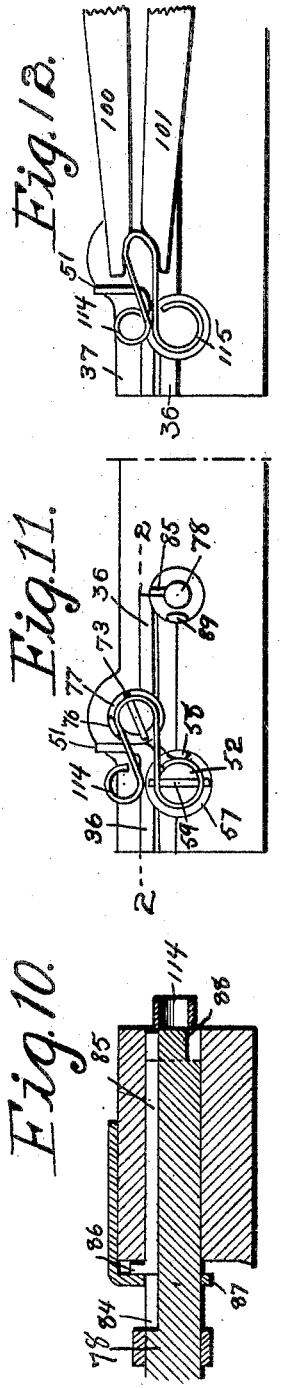
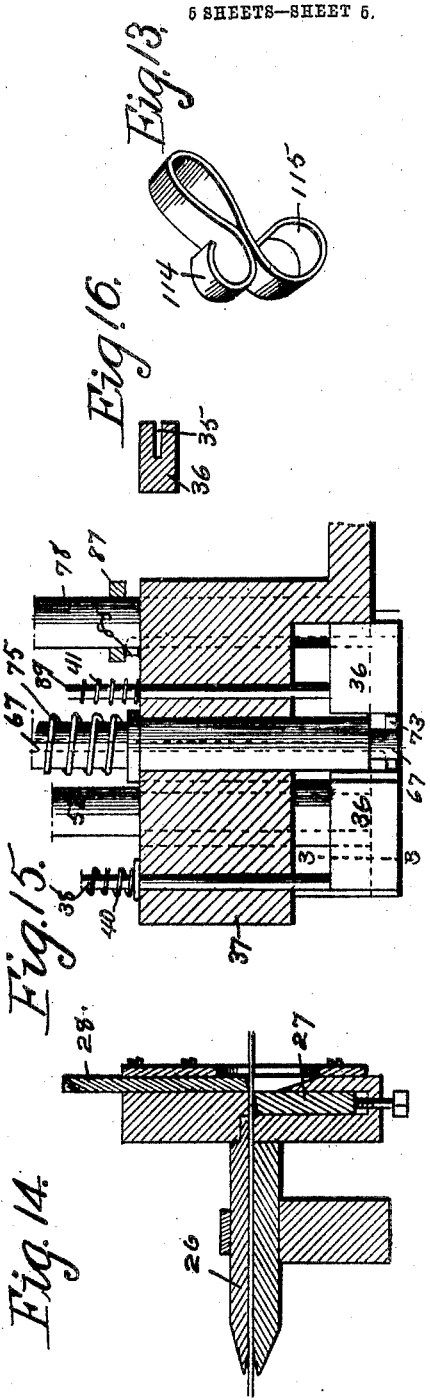
Witnesses
A. G. Hague
S. F. Christy.
Inventor J. H. McBride
By Orwig & Lane Attys

UNITED STATES PATENT OFFICE.

JOHN H. McBRIDE, OF DES MOINES, IOWA.

MACHINE FOR MAKING CLOTHES-PINS.

No. 797,741.          Specification of Letters Patent.          Patented Aug. 22, 1905.

Application filed October 17, 1904. Serial No. 228,814.

*To all whom it may concern:*

Be it known that I, JOHN H. McBRIDE, a citizen of the United States, residing at Des Moines, in the county of Polk and State of Iowa, have invented a certain new and useful Machine for Making Clothes-Pins, of which the following is a specification.

The objects of my invention are to provide a machine for making clothes-pins in which there is an advancing mechanism for feeding metal into the machine, a mechanism for severing the metal, and mechanisms for shaping the pin and ejecting it from the machine.

A further object is to provide a machine of this class which will make clothes-pins rapidly and of such construction that the clothes-pin is adapted for use on lines which are passed around wheels, so that the line may be drawn around the wheel and the pin will readily pass around the wheel without impeding the operation of the wheel even when the pins are holding the clothes on the line.

A further object is to make a pin which will hang loosely on the line and which will securely hold the material on the line by holding the parts of it together, which are immediately below the line.

My invention consists in certain details in the construction, arrangement, and combination of the various parts of the device, whereby the objects contemplated are attained, as hereinafter more fully set forth, pointed out in my claims, and illustrated in the accompanying drawings, in which—

Figure 1 is a plan view of the complete machine. Fig. 2 is a side elevation of the machine with a portion of the fly-wheel broken away and with the driving-wheel removed. Fig. 3 is a longitudinal sectional view of the machine. Fig. 4 is a sectional view of the machine cut on the line 4 4 of Fig. 1. Fig. 5 is a detail sectional view of one of the shafts for turning the loops forming the lower portions of the clothes-pin which I construct by my machine, showing one of the strips for ejecting the pin from the machine. Fig. 6 is a detail perspective view of the shaft shown in Fig. 5, showing the lugs for grasping the metal in making the large loops at the lower end of the pin and in also making the bend which forms the upper portion of the pin. Fig. 7 is a detail view showing the ends of the shafts which bend the material into the clothes-pin. This shows the metal after it is fed in between these shafts. Fig. 8 shows the same shafts as Fig. 7 after the small loop in the pin has been made. Fig. 9 shows the same parts as Fig. 8, except that it shows both the large and small loop in the pin after they are constructed. Fig. 10 is a sectional view of the shaft which forms the small loop of the pin drawn inwardly to allow the end of the metal on which the small loop has been formed to be free and to be folded over from its position shown in Fig. 10 to that shown in Fig. 11. Fig. 11 is a detail view showing the metal for the pin bent upon itself to bring the loops adjacent to each other. Fig. 12 shows in detail the pincers for completing the pin just as it is ejected from the machine. Fig. 13 shows a completed pin. Fig. 14 is a sectional view of the device, showing in detail the cutting mechanism for severing the metal forming the pin from the supply material. Fig. 15 is a sectional view of the boxing in which the shafts for forming the pins are mounted, showing the guide for the metal as it is fed into the machine and the strips for ejecting the pin from the machine. This view is taken on the line 2 2 of Fig. 11; and Fig. 16 is a sectional view cut on the line 3 3 of Fig. 15, showing the slotted guides in the metal.

*The frame and driving-shaft.*—Referring to the accompanying drawings, I have used the reference-numeral 10 to indicate the frame upon which the machine is mounted. Extending across and below the upper portion of the frame is the main driving-shaft 11, having the driving-wheel 12 mounted at one end thereof and the fly-wheel 13 at its other end.

*The feeding mechanism.*—Mounted on the shaft 11 and immediately inside of the fly-wheel 13 is a gear 14. Extending across and above the upper portion of the frame is a shaft 15, having the gear 16 at one end thereof and in mesh with the gear 14. Mounted at the other end of the shaft is a wheel 17. The end of the shaft 15, which is nearest the fly-wheel 13, is supported on the frame by the bearing 18. The other end of the shaft is mounted in the pivotal arm 19, which is pivoted to the bearing 20, which is attached to the frame, as shown in Fig. 2 of the drawings. In the free end of the pivotal arm I have provided an adjustable pin 21, having the set-screw 22 for adjusting said pin. This pivotal arm 19 is normally held at its lower limit of movement by means of the spring 22ª, which is attached to the arm and to the frame and is substantially U-shaped. Mounted on the extreme rear upper portion of the frame is a guide 23, through which the material is drawn as it is advanced from the supply-roll into the operative parts of the machine.

Mounted on the frame and forming the rear portion of the bearing is the seat 24, which is designed to be immediately beneath the pin 21. The metal as it is fed into the machine passes over the seat 24, and the pin 21 is held against the metal and holds it in a fixed position except when the pin is raised out from engagement with it and is being advanced into the machine.

Mounted on that end of the shaft 11 which is adjacent to the driving-wheel 12 and immediately beneath the wheel 17 is the sector 25, which is designed to coact with said wheel 17 in advancing the metal into the machine. When the metal is between the sector 25 and the wheel 17 and the sector is in engagement with the metal, the pivotal arm will be forced upwardly, so as to force the pin 21 out of engagement with the metal, and as the shaft 11 is rotated the sector 25, coacting with the wheel 17, will advance the material between them, and when the sector moves out of engagement with the wheel 17 the spring 22 will force the free end of the arm 19 downwardly and the pin 21 into engagement with the metal for the purpose of holding it while one of the pins is being formed. The wheels 17 and the sector 25, which coact with each other in advancing the metal, I have termed for the sake of convenience the "feeding mechanism."

*The guide and cutting mechanism.*—Attached to the frame and immediately in front of the point of contact between the sector 25 and the wheel 17 is the guide 26, which serves to guide the metal as it is fed into the knife. Attached to the frame immediately in front of the guide 26 is a cutting mechanism having the fixed blade 27 in its lower portion, which blade is designed to be beneath the metal as it is advanced, and a movable blade 28 designed to coact with the fixed blade 27 in severing the metal. Mounted on the upper portion of the movable blade is a spring 29, which is designed to normally hold this blade at its upper limit of movement. Connected with the upper portion of the movable blade 28 are the rods 30, which are pivotally attached at their lower ends to the lever 31, which lever is pivotally connected with the frame at 32. Extending upwardly from a point adjacent to the free end of the lever 31 is a projection 33, which is designed to be engaged by a cam 34, that is mounted on the shaft 11. This cam is so constructed that as the shaft 11 is rotated the free end of the lever 31 will be forced downwardly during each revolution of the shaft, and thus cause the knife to operate during each revolution of the shaft 11. This cutting operation, however, does not take place until after one of the loops of the pin has been turned.

*Bending and ejecting mechanisms.*—As the metal is advanced through the opening between the fixed and movable blades of the knife and toward the forward end of the machine it enters the slot 35 in the slotted guide 36, which is slidingly mounted immediately in front of the guide 26. Attached to the inner side of the slotted guide 36 and extending through the bearing 37 are two rods 38 and 39, having the springs 40 and 41 mounted on them, respectively, to normally hold the slotted guide 36 at its inner limit of movement. When this slotted guide is at its normal or inner limit of movement, the slot in the guide is inside of the line of advance of the metal as it is moved into the machine; but while the metal is being fed into the machine this guide is held at its outer limit of movement in the manner hereinafter described. Mounted on and fixed to the rods 38 and 39 and at the inner end of the springs 40 and 41, respectively, are the collars 42 and 43, respectively, and the inner ends of these rods are mounted in the bearing 44, which bearing is connected with the frame. Extending at substantially right angles to and immediately beneath the rods 38 and 39 and extending rearwardly from them is the shaft 45, having the pins 46 and 47 extending outwardly from it and in engagement with the collars 42 and 43, respectively. This shaft is mounted in bearings connected with the frame and has the rock-arm 48 at its rear end, said rock-arm having a roller 49 mounted on it and in mesh with the cam 50, which is mounted on the shaft 11 and rocks the shaft 45 in its bearings to throw the pins 42 and 43, respectively, and force the rods 38 and 39, together with the slotted guide 36, outwardly and throw said slotted guide into position during a certain portion of the revolution of the shaft 11 and while the metal is being advanced to a position where the metal is bent into a clothespin. As soon as the cam releases the rock-shaft 45 the springs 40 and 41 will draw the slotted guide inwardly, where it will be held until forced out to assist in ejecting the pin. The slotted guide has extended upwardly from its central portion an arm 51, which engages the inner edge of the completed clothes-pin and assists in ejecting the pin from the shafts which bend it.

Mounted in the bearings 37 and 44 and extending partially across the frame is a looping-shaft 52, having a pinion 53 at its inner end, which pinion is in mesh with a rack 54, which is reciprocated longitudinally of the frame. The rack 54 has a link 54[a] pivoted to its forward end, which link extends longitudinally of the rack and beneath it to a point where it is pivoted to the arm 54[b], which arm is pivoted at its lower end to the lower portion of the frame by means of the shaft 54[c]. Mounted on the rear portion of the arm 54[b] and a slight distance behind the pivotal point of attachment between the arm 54[b] and the link 54ᵃ is a roller 55, with which the cam 56 is designed to contact in forcing the rack 54 forwardly as the shaft 11 is rotated. This cam 56 is mounted on the shaft 11 and is rotated with it. Connected with the forward portion of the arm 54ᵇ and the frame 10 is a substantially V-shaped spring 54ᵈ, which forces the upper end of the arm 54ᵇ rearwardly, and therefore causes the rack 54 to be drawn rearwardly when the cam 56 releases it. By the operation of the cam 56 and the spring 54ᵈ the rack 54 will be reciprocated forwardly and rearwardly.

Mounted on the shaft 52 and a slight distance inside of its outer end is a sleeve 57, having a lug 58 projecting outwardly from it, so that its outer end is substantially in line with the outer end of the shaft 52. As the metal is advanced by the advancing mechanism it will be passed between the lug 58 and the shaft 52, as the lug will be at the uppermost portion of the sleeve 57 while the metal is being advanced. The outer end of the shaft is bifurcated to admit the ejector-head 59 between the bifurcated portions thereof. Attached to the head of the ejector 59 is a rod 60, which extends longitudinally of an opening in the longitudinal center of the shaft 52. This opening I have designated by the numeral 61. Mounted on the shaft 52 and outside of the inner end of the opening 61 is the collar 62, which is connected with the rod 60 by means of the screw 63, which screw is capable of a slight longitudinal movement in the shaft 52, which movement is permitted by cutting the slot 64 from the exterior of the shaft to the opening 61.

Mounted on the shaft 52 and engaging the inner portion of the sleeve 57 is a fixed collar 65. Encircling the shaft 52 and engaging the collar 65 and the collar 62 is a spring 66, which is designed to normally hold the ejector at its inner limit of movement. The collar 62 is designed to be engaged by the collar 42 and to be forced outwardly when said collar is forced outwardly, and thus force the ejector 59 outwardly when the ejector 51 is forced outwardly.

Extending transversely of the frame and immediately in front of the shaft 52 is the shaft 67, which is mounted in the bearing 37 and in a bearing 68, which extends upwardly from the frame at a point immediately behind the bearing 44. This shaft 67 has a pinion 69 at its inner end in mesh with a slidingly-mounted rack 70, which has a link, arm, spring, and roller, similar to the link 54ᵃ, arm 54ᵇ, spring 54ᶜ, and roller 55, in engagement with the cam 72, which is designed to force the rack 70 forwardly and the spring and the parts connected with it to force the rack rearwardly, so that as the shaft 11, upon which the cam 72 is mounted, is rotated the rack will be reciprocated to rotate the shaft 67 first in one direction and then in the opposite direction. The outer end of the shaft 67 is constructed similar to the shaft 52, having an ejector-head 73, similar to the ejector-head 59, and a rod similar to the rod 60 and a collar 74, similar to the collar 62 and connected with the rod 60 in the same way as the collar 62 is connected with the rod 60. A spring 75 acts in the same way on the shaft 67 as the spring 66 acts on the shaft 52. The collar 74 is in engagement with the collar 43, so that as the collar 43 is forced outwardly the collar 74 will be forced outwardly and the ejector will be also forced outwardly. There is also a lug 76 on the sleeve 77, which lug and sleeve are similar in construction to the lug and sleeve on the shaft 52. When the metal is being fed into the folding mechanism, the lug 76 is at its lower limit of movement, as shown in Fig. 7, so that the metal can be fed between the ends of the shaft 67 and the lug 76.

Extending transversely of the frame and some distance in front of the shaft 67 is a looping-shaft 78, which shaft is slidingly as well as rotatably mounted in the bearing 37 and in a bearing 79, which is on the opposite side of the frame from the bearing 37. This shaft is feathered to the pinion 80, which is mounted adjacent to the bearing 79. In mesh with the pinion 80 is the rack 81, which has a link, arm, spring, and roller connected with it and with the frame in the same manner that the link 54ᵃ, arm 54ᵇ, spring 54ᵈ, and roller 55 are connected with the rack 54 and the frame. The roller, which is similar to the roller 55, is numbered 82 and is in engagement with a cam 83, which is mounted on the shaft 11 and is so constructed that as the shaft is rotated it will force the rack forwardly, and when it releases the rack the spring acting with the parts connected with it will force the rack rearwardly, so that the rack 81 will be reciprocated and the shaft 78 will be rotated first in one direction and then in the opposite direction. In the outer end of the shaft 78 there is a longitudinal slot 84, in which the disengaging-bar 85 is slidingly mounted. The disengaging-bar 85 has a right-angled extension 86 at its inner end, which is engaged by the fixed collar 87, which collar is so constructed as to hold the disengaging-bar 85 in position where its outer end will be adjacent to the outer side of the bearing 37 and is thus constructed so that it will not be drawn inwardly as the shaft 78 is drawn inwardly to withdraw it from the loop which has been formed by it, as is described hereinafter. The outer end 88 of the shaft is made smaller than the body portion of it in order to allow the lug 89 to extend outwardly from the body portion of the shaft in such a way as to form an opening between the outer end 88 of the collar and the lug 89 of sufficient size to admit metal in which a loop is to be bent by the operation of the shaft 78. When the metal is being fed into the folding mechanism, the lug 89 is at its upper limit of movement, as shown in Fig. 7. Mounted on the shaft 78 and adjacent to the bearing 37 is the fixed collar 90, having the annular groove 91 encircling it. Pivotally mounted on the bolt 92, which extends upwardly from the frame, is a bell-crank lever having the arms 93 and 94 thereon. Extending upwardly from the free end of the arm 93 and entering the groove 91 of the collar 90 is a pin 95, so arranged that the collar can be freely rotated with the shaft and yet the shaft can be moved longitudinally by the movement of the bell-crank lever. The free end of the arm 94 of the bell-crank lever is mounted between two pins 96 and 97 on the forward end of the rack 54, which pins slide between the plates 98 and 99 as the rack is moved forwardly and rearwardly. When the rack is at its rearward limit of movement, the pin 96 engages the arm 94 of the bell-crank lever and holds the shaft 78 at its outer limit of movement, so that the outer end 88 of the shaft 78 will extend outside of the bearing 37 and will be held in that position until the rack is forced to its forward limit of movement and the pin 97 engages the rear portion of the arm 94 and causes the bell-crank lever to withdraw the shaft 78 from its outer limit of movement to its inner limit of movement, where it is retained until the operation is repeated. The disengaging-bar 85 prevents the metal forming the pin from being drawn inwardly when the shaft 78 is drawn inwardly. The shafts 52 67 78 and their attachments form what I have termed for the sake of convenience the "folding" mechanism.

*Finishing mechanism.*—Pivotally attached to the frame and slightly outside of the line of advance of the metal as it is fed into the folding mechanism is the pair of pincers, having the jaws 100 and 101 pivotally attached to the supports 102 and having forwardly-extending members 103 and 104, which take the place of handles in the ordinary pincers. The rear ends of the jaws are rounded to receive the rounded upper portion of the clothes-pin while it is being ejected from the machine, and these jaws are adapted to complete the folding operation of the material used for making the pin and place it in a finished condition and in readiness for use by forcing the parts of the metal which are to engage the clothes into engagement with each other, thus giving a tension to the material used on account of the engagement of the parts with each other. Entering a notch in the upper surface of the forward portion of the forwardly-extending member 103 and entering a notch in the under surface of the forwardly-extending member 104 is a spring 105, designed to normally hold the free ends of the jaws away from each other. Mounted between the forward ends of the forwardly-extending member 103 and 104 is a diamond-shaped block 107, which is mounted on a rock-shaft 108, mounted above the frame 10, which rock-shaft has pivoted to its lower end a link 109, said link being connected with a lever 110, which is pivoted to the shaft $54^c$ at its lower end. This lever 110 is normally held at its rearward limit of movement by means of the spring 111, which is similar in construction to the spring $54^d$. Mounted at the rear upper end of the lever 110 is a roller 112, similar in construction to the roller 55. This roller 112 is in engagement with the cam 113, which is mounted on the shaft 11, and is designed to force the lever 110 forwardly against the resistance of the spring 111 and rock the shaft 108, which turns the diamond-shaped block in such a way as to force the forward ends of the members 103 and 104 apart and the jaws 100 and 101 together to pinch the metal in the manner above described. As soon as the cam releases the spring 111 this spring will rock the shaft 108 to its rearward limit of movement and allow the jaws 100 and 101 to be separated. Throughout the entire specification the forward end of the machine is that toward which the metal is advanced in feeding and the rear end is that into which the metal is drawn in operation and the outer side of the machine that which is nearest the driving-wheel.

*Practical operation.*—In practical operation and assuming that the metal has been started into the feeding mechanism and forced into the machine, as shown in Fig. 7, by the feeding mechanism the cam 83 will be forced into operation by the rotation of the shaft 11 and the shaft 78 will be given a revolution and will make the small loop 114, as shown in Fig. 8. The cutting mechanism is then brought into play and the metal used to form the pin is severed from the supply. The shaft 52 is then given a rotation and the large looping 115, as shown in Fig. 9, is formed. By the same movement which operates the shaft 52 the shaft 78 is withdrawn, as shown in Fig. 10, from the loop 114, and the shaft 67 is given a revolution by the cam which operates it and the metal is folded into the position shown in Fig. 11 of the drawings. The ejectors, which are withdrawn by their cam as soon as the first bend in the metal has been made, are forced outwardly to force the pin off from the shafts 52 and 67 to a position between the jaws 100 and 101, where they are forced into the position shown in Fig. 12 and are allowed to drop from between these jaws completed, as shown in Fig. 13, when the jaws are allowed to open. All of the above operations are accomplished by the simple rotation of the driving-shaft, which may be rotated either by hand or by power.

Having thus described my invention, what I claim, and desire to secure by Letters Patent of the United States therefor, is—

1. In a device of the class described, a metal-feeding mechanism, means for bending a small loop at one end of the metal, a cutting mechanism for severing the metal to be bent from the supply metal, means for bending a larger loop at the other end of the metal, means for bending the metal at a point substantially midway between its ends so that the free ends of the metal will be adjacent to each other and an opening will be formed between that portion of the metal which is between the loops, means for ejecting the metal after it has been bent from the machine, and pincers for forcing the metal forming the sides of the loops into engagement with each other.

2. In a device of the class described, a metal-feeding mechanism, means for bending a small loop at one end of the metal, a cutting mechanism for severing the metal to be bent from the supply metal, means for bending a larger loop at the other end of the metal, means for bending the metal at a point midway between the loops so that the loops will be adjacent to each other, and pincers for forcing the metal forming the sides of the loops into engagement with each other.

3. In a machine for making clothes-pins, a feeding mechanism, a shaft for bending a small loop at one end of a piece of metal, a shaft for bending a larger loop at the other end of a piece of metal, means for withdrawing the shaft which bends the small loop from the loop which has been bent, a shaft for bending the metal at approximately its central portion in such a way that the loops will approach each other as soon as the shaft for bending the small loop has been withdrawn, pincers, the jaws of which are normally held apart for bending the metal so as to force the inner portions of the loop into engagement with each other when the jaws are forced toward each other, and means for driving the operative parts of the device.

4. In a machine for making clothes-pins, a feeding mechanism, a shaft for bending a small loop at one end of a piece of metal, a shaft for bending a larger loop at the other end of a piece of metal, means for withdrawing the shaft which bends the small loop from the loop which has been bent, a shaft for bending the metal at approximately its central portion in such a way that the loops will approach each other as soon as the shaft for bending the small loop has been withdrawn, pincers, the jaws of which are normally held apart for bending the metal so as to force the inner portions of the loop into engagement with each other when the jaws are forced toward each other, ejectors for removing the metal from the shafts which bend it, and means for driving the operative parts of the device.

5. In a machine for making clothes-pins, a feeding mechanism, a shaft for bending a small loop at one end of a piece of metal and a shaft for bending a large loop at the other end of a piece of metal, each shaft having a lug extending parallel with it and a slight distance away from it so that the metal is allowed to pass between the lugs and the shafts while it is being bent as the shafts are rocked, means for withdrawing the shaft which bends the small loop from this loop after it has been bent, a shaft for bending the metal at its central portion so that the loops at the ends of the piece of metal will be adjacent to each other, ejectors in the shafts which bend the large loop and the central portion of the metal for forcing the bent metal from these shafts, and means for forcing the metal forming the loops at the ends of it into springing engagement with each other.

JOHN H. McBRIDE.

Witnesses:
  W. R. LANE,
  S. F. CHRISTY.